United States Patent
Yamamoto et al.

(10) Patent No.: US 7,729,132 B2
(45) Date of Patent: Jun. 1, 2010

(54) HARNESS WIRING STRUCTURE

(75) Inventors: Masataka Yamamoto, Kosai (JP);
Mitsunori Tsunoda, Kosai (JP);
Tomoyasu Terada, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/751,074

(22) Filed: May 21, 2007

(65) Prior Publication Data
US 2007/0267211 A1    Nov. 22, 2007

(30) Foreign Application Priority Data
May 19, 2006    (JP)    ............... 2006-140256

(51) Int. Cl.
*H02B 1/20*    (2006.01)
(52) U.S. Cl. .............. 361/826; 361/827; 174/72 A
(58) Field of Classification Search ............. 361/826; 211/26
See application file for complete search history.

(56) References Cited

U.S. PATENT DOCUMENTS

| | | | | |
|---|---|---|---|---|
| 3,710,199 | A * | 1/1973 | Cignoni, Jr. ................ | 361/827 |
| 6,070,742 | A * | 6/2000 | McAnally et al. ............ | 211/26 |
| 6,305,556 | B1* | 10/2001 | Mayer ........................ | 211/26 |
| 6,945,504 | B2* | 9/2005 | Chen et al. ................ | 248/282.1 |
| 7,009,112 | B1* | 3/2006 | Mead et al. ................ | 174/69 |
| 2004/0000422 | A1 | 1/2004 | Tsutsumi et al. | |
| 2005/0145582 | A1* | 7/2005 | Dubon et al. ................ | 211/26 |

FOREIGN PATENT DOCUMENTS

| | | |
|---|---|---|
| DE | 10319826 A1 | 1/2004 |
| JP | 58-8425 A | 1/1983 |
| JP | 5-26664 A | 4/1993 |
| JP | 10-175483 A | 6/1998 |
| JP | 11-34763 A | 9/1999 |
| JP | 2001-151042 A | 6/2001 |
| JP | 2001-260770 A | 9/2001 |
| JP | 2006-42566 A | 9/2006 |

OTHER PUBLICATIONS

Chinese Patent Office Action dated Feb. 6, 2009 for Chinese Patent Application No. 200710107597.X.
German Office Action issued Jul. 23, 2009.

* cited by examiner

*Primary Examiner*—Dameon E Levi
(74) *Attorney, Agent, or Firm*—Sughrue Mion, PLLC

(57) ABSTRACT

A harness wiring structure includes a first link that has a first fixing member, a second link that has a second fixing member, and a shaft portion that swingably connects the first link to the second link. When the first link and the second link are extended to each other, a wire harness is wired in a straight line so as to pass above the shaft portion and is fixed to the first link and the second link by the first fixing member and the second fixing member respectively.

7 Claims, 8 Drawing Sheets

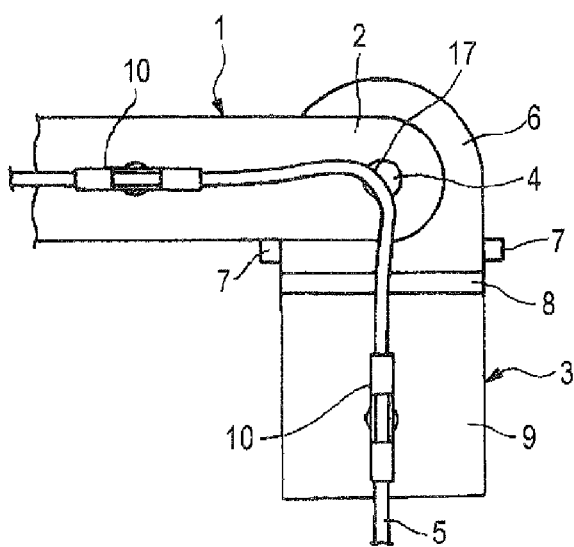
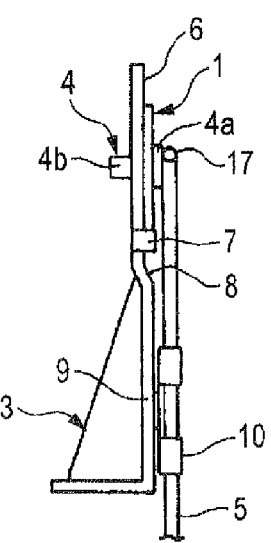
FIG. 1A
FIG. 1B

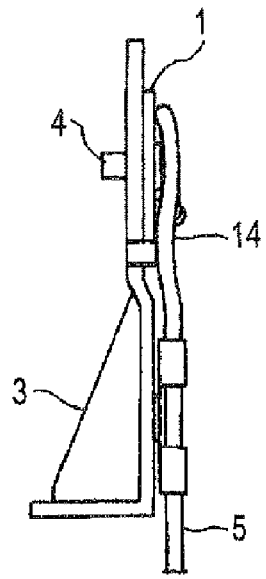
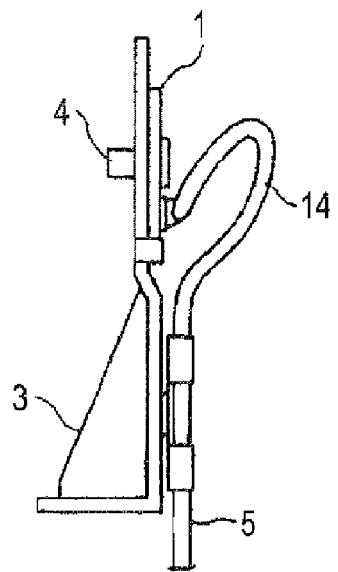
FIG. 6A   FIG. 6B
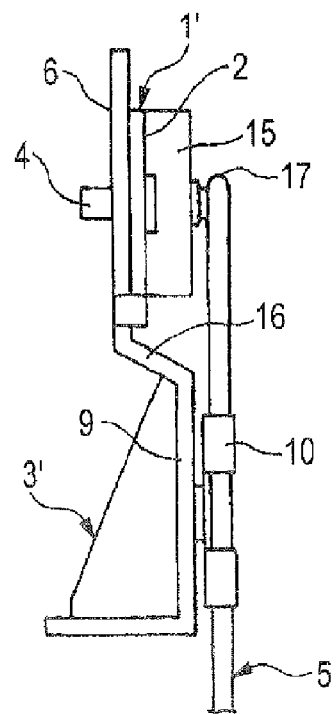
FIG. 7

HARNESS WIRING STRUCTURE

BACKGROUND OF THE INVENTION

The present invention relates to a harness wiring structure for a swing part where a wire harness is wired along swingable links.

FIGS. 9 to 11 show an example of a harness wiring structure for a swing part in the related art (referring to Patent Document 1).

As shown in FIG. 9, this harness wiring structure is used to always feed power from a body of a vehicle (power source) to a sliding door. Further, according to a power feeding system 31 provided in the body of the vehicle, as the sliding door (not shown) is opened or closed, the wire harness 32 is wired so as to swing forward or backward.

As shown in FIGS. 10 and 11, the power feeding system 31 includes a case 33 and a swing member 34 provided in the case. The swing member 34 has a split-type structure to be split into upper and lower portions. Accordingly, while a Colgate tube 35 of the wire harness 32 is held in the swing member, the swing member freely swings about a shaft portion 36 together with the wire harness 32 in the case.

A wide opening 37 through which the wire harness 32 is swingably led, an arc-shaped groove 38 for regulating a swing angle of the swing member 34, a fixing portion 40 for fixing an electric wire 39 of the wire harness 32, and a space 41 where the electric wire 39 is received in a waveform between the swing member 34 and the fixing portion 40 are formed in the case 33.

As shown in FIG. 9, the wire harness 32 led from the power feeding system 31 is connected to each accessory (not shown) in the sliding door via a power feeding system 42 of the sliding door. The power feeding system 42 of the sliding door includes an oscillation type slider 43 in a case 44. As the sliding door is opened or closed, the slider moves forward or backward. The wire harness 32 is bent (compressed) to substantially have a U shape in the case. Other systems (not shown) may be used as the power feeding system 42 of the sliding door.

The power feeding system 42 shown in FIG. 9 by using a solid line corresponds to the state where the sliding door is closed, and the power feeding system 42 shown in FIG. 9 by using a two-dot chain line corresponds to the state where the sliding door is opened. The power feeding system 31, which is shown in FIG. 10, of the body of a vehicle corresponds to the power feeding system 42 (the state where the sliding door is closed) shown in FIG. 9 by using a solid line. Further, the power feeding system 31 shown in FIG. 10 corresponds to the power feeding system 42 (the state where the sliding door is opened) shown in FIG. 9 by using a two-dot chain line.

FIG. 12 shows a harness wiring structure for a swing part in the related art (referring to Patent Document 2).

This harness wiring structure is used to always feed power to a link type door of a vehicle. Further, the door 62 is swingably supported with a body 70 of a vehicle by a supporting arm 71 having substantially L shape. Further, a pair of front and rear links 65 and 66 is provided to be separated from the supporting arm 71, and is provided parallel to each other. A base of each of the links 65 and 66 is rotatably supported by the body 70 of a vehicle, and a tip of each link is rotatably supported by the slider 64. The slider 64 is slidably engaged with a horizontal guide rail 63 of the door, and a wire harness 68 is wired along the one (front) link 66 from the body 70 of a vehicle to the door.

The wire harness 68 is wired along the outer surface of the link 66, and is fixed to the link 66 by using a fastener 72. Further, the wire harness is led into the door, while being bent substantially in a U shape or J shape along a caterpillar-shaped exterior member 69 connected to the slider 64 in the guide rail of the door. Accordingly, the wire harness is connected to the accessories or electrical components. The right side in FIG. 12 corresponds to a front side of a vehicle.

When the door is fully closed, the supporting arm 71 and the links 65 and 66 extend toward the front side. Further, the slider 64 moves toward the front end of the guide rail 63, and a part of the wire harness 68 is received in a receiving case 67 due to the bending operation of the exterior member 69. The wire harness 68 swings (rotates) together with the link 66

When the door is fully opened, the links 65 and 66 are maintained in the half open state shown in FIG. 12, and the supporting arm 71 extends toward the rear side. Further, the slider 64 moves toward the rear end of the guide rail 63, and the wire harness 68 is led toward the rear side together with the exterior member 69.

[Patent Document 1] JP-A-2006-42566 (FIGS. 1 to 4)
[Patent Document 2] JP-A-10-175483 (FIGS. 5 and 9)

However, according to the harness wiring structure for a swing part shown in FIGS. 9 to 11, the space 41 where the electric wire 39 of the wire harness 32 is received in a waveform is required in the case 33. For this reason, there have been problems in that the size of the case 33 is increased and the body of the vehicle should have a large space for the case. In addition, since the case 33 and the swing member 34 are required in the harness wiring structure, there have been problems in that the structure becomes complicated and the manufacturing cost increased.

Further, according to the harness wiring structure for a swing part in the related art shown in FIG. 12, as the door 62 is opened or closed, the wire harness 68 loosens and is bent at the end of the link 66 during the swing of the link 66. For this reason, when the wire harness is repeatedly bent, there is a concern that the loosening portion (portion corresponding to a surplus length) of the wire harness 68 is damaged or caught between the link 66 and a frame 73.

SUMMARY OF THE INVENTION

The invention has been made to solve the above-mentioned problems, and it is an object of the invention to provide a harness wiring structure for a swing part that can prevent a wire harness from loosening and improve durability of the wire harness at low cost without complicated structure.

In order to achieve the above-mentioned object, according to the present invention, there is provided a harness wiring structure, comprising:

a first link that has a first fixing member;
a second link that has a second fixing member; and
a shaft portion that swingably connects the first link to the second link, wherein when the first link and the second link are extended to each other, a wire harness is wired in a straight line so as to pass above the shaft portion and is fixed to the first link and the second link by the first fixing member and the second fixing member, respectively.

According to the above-mentioned structure, as the first link swings (rotates) with respect to the second link, the wire harness is always bent on the shaft portion (on an extension line of the shaft portion) to the right and left sides. For this reason, the wire harness does not loosen (does not have a surplus length) in the vicinity of the shaft portion. Further, it is possible to prevent the wire harness from being caught due to the loosening of the wire harness, and to prevent the wire harness from being damaged due to the bending of the wire harness in a complicated shape. The first link may be used as a movable member, and the second link may be used as a stationary member. Alternatively, the first and second links may be used as movable members. As long as the wire harness passes above the shaft portion (preferably, on the center of the shaft portion), the wire harness may be wired parallel to the links or may be wired to be inclined with respect to the links. In addition, the shaft portion may be positioned on the centerline of the first link or the second link, and at a position deviating from the centerline. Even in any case, when the first link or the second link rotates, the bent portion of the wire harness (bent point) is positioned on the shaft portion.

Preferably, the wire harness is wired on a centerline of at least one of the first link and the second link.

Preferably, the wire harness is wired on an imaginary line deviating from a centerline of at least one of the first link and the second link.

According to the above-mentioned structures, when the wire harness is wired on the centerlines of the first link and the second link, the wire harness and the shaft portion are positioned in the middle of the first link and the second link in the width directions thereof. Further, when the wire harness is wired on the imaginary line deviating from the centerline of either one of the first link and the second link, the length of the wire harness is decreased by a length corresponding to a distance deviating from the centerline. Even in any case, when the wire harness is wired to be inclined with respect to the links, it is possible to set the length of the wire harness to a minimum length.

Preferably, the first fixing member is provided on a centerline of the first link or on an imaginary line deviating from the centerline of the first link.

Preferably, the second fixing member is provided on a centerline of the second link or on an imaginary line deviating from the centerline of the second link.

According to the above-mentioned structure, when the wire harness passes above the shaft portion and is wired and fixed in the middle of each link in the width direction or at a position deviating from the middle of the link in the width direction, it is possible to obtain the same advantages as the above harness wiring structure.

Preferably, a first distance is set so as to be equal to a second distance. The first distance is defined as a distance between the shaft portion and the first fixing member. The second distance is defined as a distance between the shaft portion and the second fixing member.

According to the above-mentioned structure, when the first and second links swing to each other, the same bending stress, tensile stress, and compressive stress is applied to both of the portion of the wire harness corresponding to a distance between the shaft portion and the first fixing member of the first link, and the portion of the wire harness corresponding to a distance between the shaft portion and the second fixing member of the second link. For this reason, the position of the bent portion of the wire harness is correctly regulated on the shaft portion. Therefore, it is possible to more reliably prevent the wire harness from loosening (having a surplus length).

Preferably, a stepped portion for receiving a bent portion of the wire harness is provided on at least one of the first link and the second link at a shaft portion side thereof.

According to the above-mentioned structure, even though the wire harness is bent on the shaft portion and the bent portion of the wire harness comes in contact with (interferes with) the link during the swing of the first and second links, the bent portion is led into (received in) the stepped portion of at least one of the links. Therefore, it is possible to prevent the wire harness from interfering with the surface of the links.

According to the present invention, when the link swings, the wire harness does not loosen in the vicinity of the shaft portion. Further, it is possible to prevent the wire harness from being caught or damaged due to the loosening of the wire harness, and to improve the durability of the wire harness. Therefore, it is possible to improve the reliability of power feeding using the wire harness. In addition, it is possible to improve the reliability of power feeding using the simple, space-saving, and inexpensive structure, which uses two links and a shaft portion.

According to the present invention, the wire harness is wired along the links to have a minimum length. Accordingly, it is possible to more reliably prevent the wire harness from loosening. Further, since electrical resistance and manufacturing cost are decreased, it is possible to more reliably improve the reliability of power feeding.

According to the present invention, when the links swing, the wire harness is reliably bent on the shaft portion. Therefore, it is possible to facilitate the advantage of the invention disclosed in the above configuration.

According to the present invention, the bent portion of the wire harness does not come in contact with (does not interfere with) the links during the swing of the links. Therefore, it is possible to more reliably improve the reliability of power feeding.

BRIEF DESCRIPTION OF THE DRAWINGS

The above objects and advantages of the present invention will become more apparent by describing in detail preferred exemplary embodiments thereof with reference to the accompanying drawings, wherein:

FIGS. 1A and 1B show harness wiring structures according to the invention, FIG. 1A is a plan view of the harness wiring structure, and FIG. 1B is a side view of the harness wiring structure;

FIG. 2A is a plan view of the harness wiring structure, and FIG. 2B is a side view of the harness wiring structure;

FIG. 3A is a plan view of the harness wiring structure, and FIG. 3B is a side view of the harness wiring structure;

FIGS. 6A and 6B are side views showing problems corresponding to FIG. 5;

FIG. 7 is a side view of a modification for coping with the problems of FIG. 6;

DETAILED DESCRIPTION OF THE PREFERRED EMBODIMENTS

Figure 2A:
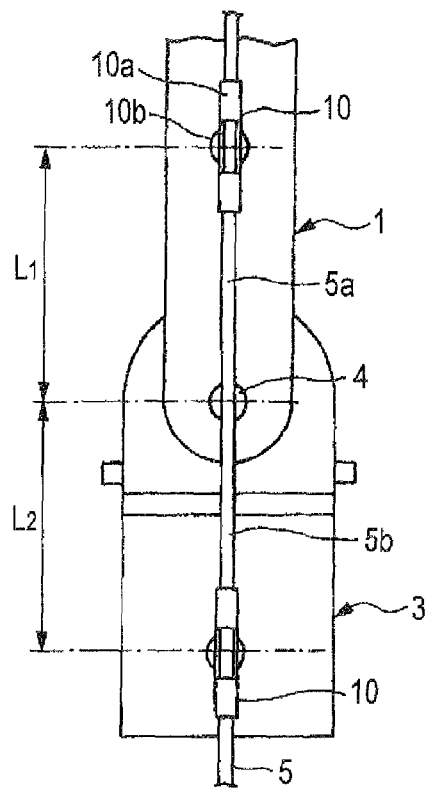
FIGS. 2A and 2B show the harness wiring structures indicating that the wire harness extends in a straight line.

FIGS. 1A to 3B show a harness wiring structure for a swing part according to an embodiment of the invention.

An end 2 of a link (one link) 1 is connected to a stationary supporting link or a base (the other link) 3 by using a shaft portion 4 so that the link 1 can swing (rotate) about the shaft portion 4. A wire harness 5 is wired along the middle of the link 1 in a width direction of the link and the middle of the supporting link 3 in a width direction of the supporting link. Further, the wire harness 5 is wired to pass above the shaft portion 4, which is disposed in the middle of the link 1 and the supporting link 3.

The wire harness 5 is wired to pass above the middle of the link 1 and the supporting link 3 and the shaft portion 4. Accordingly, when the link arm 1 swings at an angle of 180° as shown in FIGS. 1A to 3B, the wire harness 5 does not have a loosening portion (portion corresponding to a surplus length) and is bent on the shaft portion 4 so as to always have a regular path (a bent portion is indicated by reference numeral 17).

The link 1 has the shape of a flat and long plate, and is horizontally disposed. Further, the supporting link 3 has a width larger than that of the link 1, and is horizontally disposed. The link 1 may be referred to as a link arm. One end 2 of the link 1 is rotatably supported with a flat front half 6 of the supporting link 3, by using the shaft portion 4. The shaft portion 4 passes through circular holes (not shown) of the link 1 and the supporting link 3, and a flat head 4a (see FIG. 1B) of the shaft portion 4 comes in contact with the surface of the link 1. Further, a body 4b, which passes through the holes, of the shaft portion 4 is fixed to the backside of the supporting link 3 by fastening a nut or caulking.

A pair of stoppers 7, which regulates a swing angle of the link 1, protrudes from both sides of the front half 6 of the supporting link 3. If the position of each stopper 7 is changed, the swing angle of the link can be regulated so as to be smaller than 180° or larger than 180°. The front half 6 of the supporting link 3 is connected to a raised rear half 9 through a stepped portion 8. In addition, the stepped portion 8 is formed to have substantially the same height as a thickness of the link 1, so that the outer surface of the link 1 is substantially flush with the outer surface of the rear half 9 of the supporting link 3.

Figure 2B:
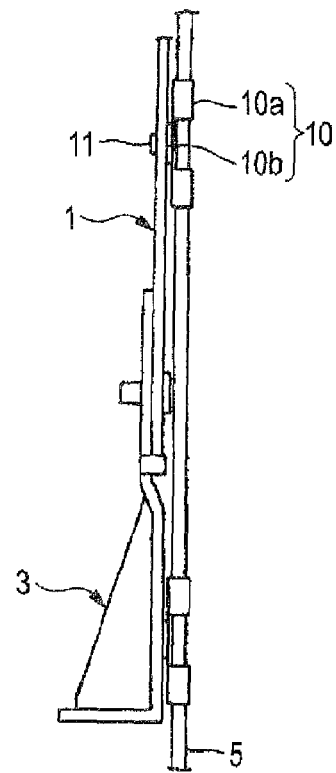

Fasteners (fixing members) 10 are provided in the middle of the rear half 9 of the supporting link 3 in the width direction of the supporting link, and in the middle of the link 1 in the width direction of the link near the shaft portion 4, respectively. The wire harness 5 is fixed to the fasteners 10. As shown in FIGS. 2A and 2B, when the link 1 and the supporting link 3 extend in a straight line in the same direction, an imaginary line connecting each of the fasteners 10 with the shaft portion 4 aligns. Accordingly, the imaginary line corresponds to the wire harness 5, and the wire harness 5 is not bent and extends in a straight line.

Further, distances $L_1$ and $L_2$ between the shaft portion 4 and fasteners 10 are set to be substantially equal to each other. Since the distances $L_1$ and $L_2$ between the shaft portion 4 and fasteners 10 are equal to each other, a bending force applied to a wire harness portion 5a between the shaft portion 4 and the fastener 10 corresponding to the link 1 becomes equal to a bending force applied to a wire harness portion 5b between the shaft portion 4 and the fastener corresponding to the supporting link 3 during the swing of the link 1. For this reason, the wire harness 5 is reliably bent on the shaft portion 4 provided in the middle of the links (a bent portion is indicated by reference numeral 17). Therefore, it is possible to reliably prevent the wire harness 5 from loosening.

Each of the fasteners 10 includes a cylindrical part 10a (see FIGS. 2A and 2B) for supporting the wire harness 5, and a fixing part 10b provided perpendicular to the cylindrical part 10a. The fixing part 10b is composed of a male thread and a collar, which pass through the holes (not shown) of the link 1 and the supporting link 3 and are fixed to the backside of the link 1 or the supporting link 3 by using a nut 11 (see FIGS. 2A and 2B) or the like. It is preferable that the cylindrical part 10a have a split-type structure to facilitate a work to support the wire harness 5.

The wire harness 5 includes a plurality of electric wires, and a protective tube (also indicated by reference numeral 5) that is made of a synthetic resin or rubber and covered around the electric wires. It is preferable that the protective tube have flexibility higher than that of the electric wires. A Colgate tube, in which grooves and protrusions formed in a circumferential direction thereof are alternately formed thereon in a longitudinal direction of the tube, may be used as the protective tube. In this case, ribs to be engaged with the grooves are formed on the inner peripheral surface of the cylindrical part 10a of the fastener 10 so that the Colgate tube does not moves in the longitudinal direction and is fixed.

If a Colgate tube having a circular cross-section is used as the protective tube, the protective tube is supported by the fastener 10 so as to freely move in the circumferential direction thereof. Therefore, it is possible to absorb the torsion of the wire harness. When a Colgate tube having an oval cross-section is used as the protective tube, it is possible to obtain excellent flexibility by allowing a bending direction of the tube to correspond to a direction of a minor axis of the tube.

Figure 3A:
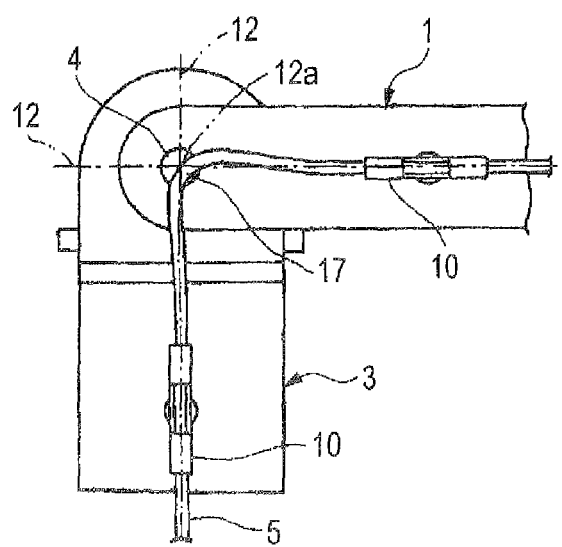
FIGS. 3A and 3B show the harness wiring structure indicating that the wire harness swings in a direction opposite to the direction in FIG. 1A.

When the link 1 swings to the left side (in a counterclockwise direction) as shown in FIGS. 1A and 1B, the wire harness 5 is bent in an arc shape on the shaft portion 4. When the link 1 extends in a straight line on an extension line of the supporting link 3 as shown in FIGS. 2A and 2B, the wire harness 5 passes above a centerline of the shaft portion 4. When the link 1 swings to the right side (in a clockwise direction) as shown in FIGS. 3A and 3B, the wire harness 5 is bent in an arc shape on the shaft portion 4.

Figure 3B:
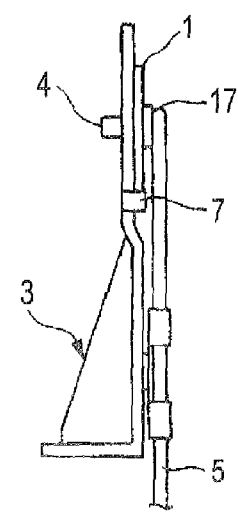

In FIGS. 1A and 3B, the wire harness 5 slightly deviates from the center of the shaft portion 4 (an intersection 12a between X and Y imaginary centerlines of the shaft portion 4) toward the inside of the wire harness in the bending direction. At the worst, the wire harness is bent in the vicinity of the shaft portion 4, without a loosening portion. This is caused by allowing the centerline of the shaft portion 4 to correspond to the centerline of each fastener 10, and is facilitated by setting the distances $L_1$ and $L_2$ between the shaft portion 4 and fasteners 10 to be equal to each other.

Figure 4:
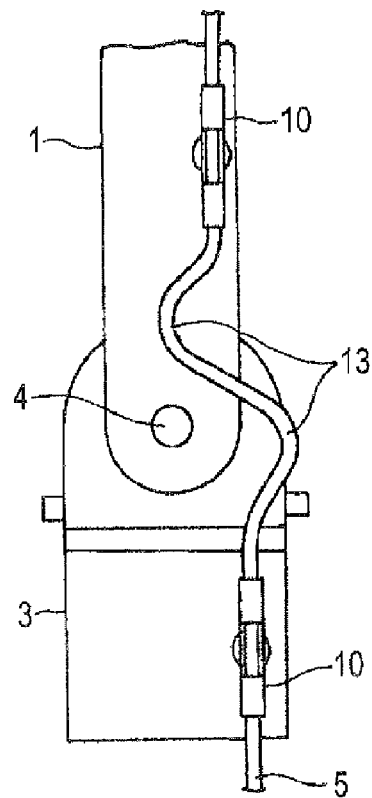
FIG. 4 is a plan view of the wire harness, which is wired to deviate from a centerline of a link.
Figure 5:
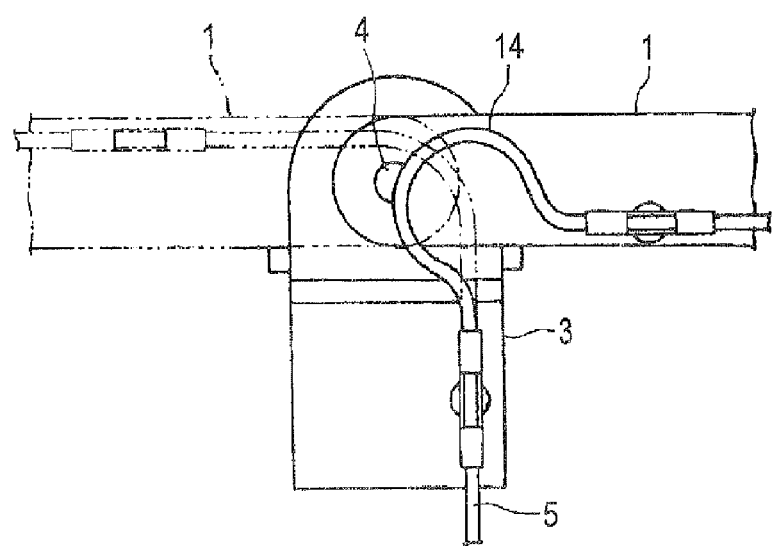
FIG. 5 is a plan view showing that the wire harness swings.

For example, as shown in FIGS. 4 and 5, the wire harness 5 is wired not in the middle of the link 1 and the supporting link 3 in the width direction, but in the vicinity of one side of the link 1 and the supporting link 3. When an imaginary line connecting the fasteners 10 with each other deviates from the center of the shaft portion 4 as shown in FIG. 4, the wire harness 5 needs to have a loosening portion 13 (portion corresponding to a surplus length) in the vicinity of the shaft portion 4 during the extension of the link 1 as shown in FIG. 4.

Further, when the link 1 swings to the left side (in a counterclockwise direction) as shown in FIG. 5 by a two-dot chain line, the wire harness 5 is bent in an arc shape outside the shaft portion 4 (the wire harness 5 needs to have a loosening portion 13 of FIG. 4 so as to be smoothly bent in an arc shape). Further, when the link 1 swings to the right side (in a clockwise direction) as shown in FIG. 5 by a solid line, the wire harness 5 has a loop-shaped loosening portion 14 (portion corresponding to a surplus length) in the vicinity of the shaft portion 4. Accordingly, a bending resistance of the wire harness 5 deteriorates due to the S-shaped loosening portion 13 of FIG. 4 and the loop-shaped loosening portion 14 of FIG. 5. In addition, there is a concern that the loosening portion 14 is held between the link 1 and the supporting link 3.

While the link 1 swings as shown in FIG. 5 by a solid line (while the link 1 swings as shown in FIG. 5 by a two-dot chain line, it is also similar), the loop-shaped loosening portion 14 of the wire harness 5 comes in contact with (interferes with) the link 1 as shown in FIG. 6A, which causes friction. Alternatively, the loop-shaped loosening portion 14 of the wire harness 5 is separated (lifted) from the link 1 in a thickness direction. For this reason, there is a problem in that the loop-shaped loosening portion interferes with or is caught by other structures.

Since the wire harness 5 is bent on the shaft portion 4 as shown in FIGS. 1A to 3B, the wire harness 5 is not bent (loosens) substantially in an S-shape as shown in FIG. 4 or is not bent (loosens) substantially in a loop shape as shown in FIG. 5. For this reason, it is possible to prevent the above-mentioned problems shown in FIGS. 6A and 6B.

FIG. 7 shows a harness wiring structure for a swing part according to a second embodiment of the invention. The same elements as those in the embodiment shown in FIGS. 1A and 1B are indicated by the same reference numerals as those in the embodiment shown in FIGS. 1A and 1B, and the detailed description thereof will be omitted.

In particular, in order to more reliably solve the problem shown in FIG. 6A, this harness wiring structure includes a stepped portion 15 formed on a link 1' in the vicinity of a shaft portion 4, an inner space (also indicated by reference numeral 15) of the stepped portion 15 that is used as an escape space (receiving space) for a bent portion 17 of a wire harness 5, and a stepped portion 16 (having substantially the same depth as the height of the stepped portion 15) that is formed on a supporting link 3' and absorbs the stepped portion 15 of the link 1', in addition to the harness wiring structure according to the embodiment shown in FIGS. 1A to 3B. Accordingly, even though the bent portion 17 of the wire harness 5 is bent toward the link 1' on or near the shaft portion 4, it is possible to prevent the bent portion 7 from coming in contact with (interfering with) the link 1'.

A front half 6 of the supporting portion 3' is formed to be positioned at a position lower than a rear half 9 through the stepped portion 16. Further, one end 2 of the link 1' is rotatably connected to the front half 6 by using the shaft portion 4. Harness fasteners 10 are provided to be slightly separated from the rear half 9 of the supporting link 3 from the one end 2 of the link 1' toward the other end (not shown). Accordingly, the wire harness 5 is supported by two fasteners 10 so as to be wired parallel (horizontally) to the supporting link 3' or the link 1'. It is preferable that the distances $L_1$ and $L_2$ (see FIGS. 2A and 2B) between the shaft portion 4 and the fasteners 10 be substantially equal to each other.

The structure including the stepped portions (harness escape portions) 15 and 16 of the embodiment shown in FIG. 7 is effective for the wire harness 5, which is wired not on the shaft portion 4 and wired to deviate from the shaft portion 4 in the width direction of the link as shown in FIGS. 4 to 6B.

Figure 8:
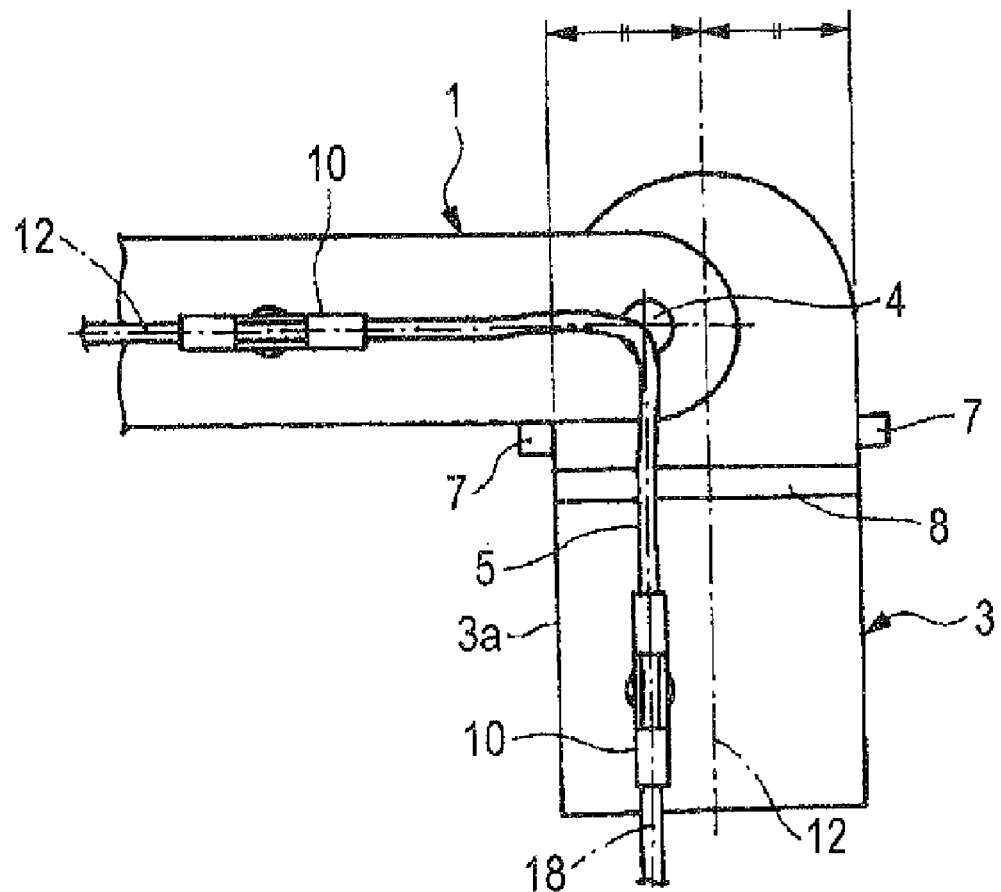
FIG. 8 is a plan view of an embodiment where a wire harness is disposed to has the same center as a shaft portion and to deviate from a centerline of a supporting link.

FIG. 8 shows another embodiment. According to this embodiment, a wire harness 5 passes above the shaft portion 4 and is wired in the middle (on the centerline) of a link (one link) 1 in a width direction of the link and wired at a position (on an imaginary line 18) deviating from a centerline 12 of a supporting link (the other link) 3.

A fastener 10 corresponding to the link 1 is disposed on the centerline of the link 1, and a fastener 10 corresponding to the supporting link 3 is disposed on the imaginary line 18. Distances between the shaft portion 4 and the fasteners 10 are equal or substantially equal to each other. In the supporting link 3, the wire harness 5 is wired parallel to a side 3a and a centerline 12 of the supporting link 3. The imaginary line 18 is parallel to the centerline 12.

According to the embodiment shown in FIG. 8, when the link 1 swings to the left side as shown in FIG. 8, it is possible to set the length of the wire harness 5 to a minimum length (for example, when the wire harness 5 is wired along the centerline 12 of the supporting link 3, the length of the wire harness 5 is increased by a distance between the centerline 12 and the imaginary line 18). In particular, when the wire harness 5 swings from a position where the wire harness 5 extends in a straight line (two links 1 and 3 align on a straight line) to the left side by 90°, the above-mentioned structure is effective.

In addition, like in the embodiment shown in FIGS. 2A and 2B, if the wire harness 5 is wired on the centerlines 12 of the links 1 and 3 or on the imaginary line 18 deviating from the centerline 12 as compared to when the wire harness 5 passes above the shaft portion 4 and is wired to be inclined with respect to the links 1 and 3 (it id possible to obtain the same advantages as the embodiment shown in FIGS. 1A and 1B even in this embodiment), it is possible to set the length of the wire harness 5 to a minimum length.

Meanwhile, in FIG. 8, the wire harness 5 is not wired along the centerline 12 of the link 1, and may be wired at a position (on an imaginary line) deviating from the centerline 12 toward one side of the link 1. In this case, it goes without saying that the shaft portion 4 and the fastener 10 are disposed at eccentric positions of the link 1 (on the imaginary line). Further, the harness interference preventing structure shown in FIG. 7 can be applied to the embodiment shown in FIG. 8.

Figure 9:
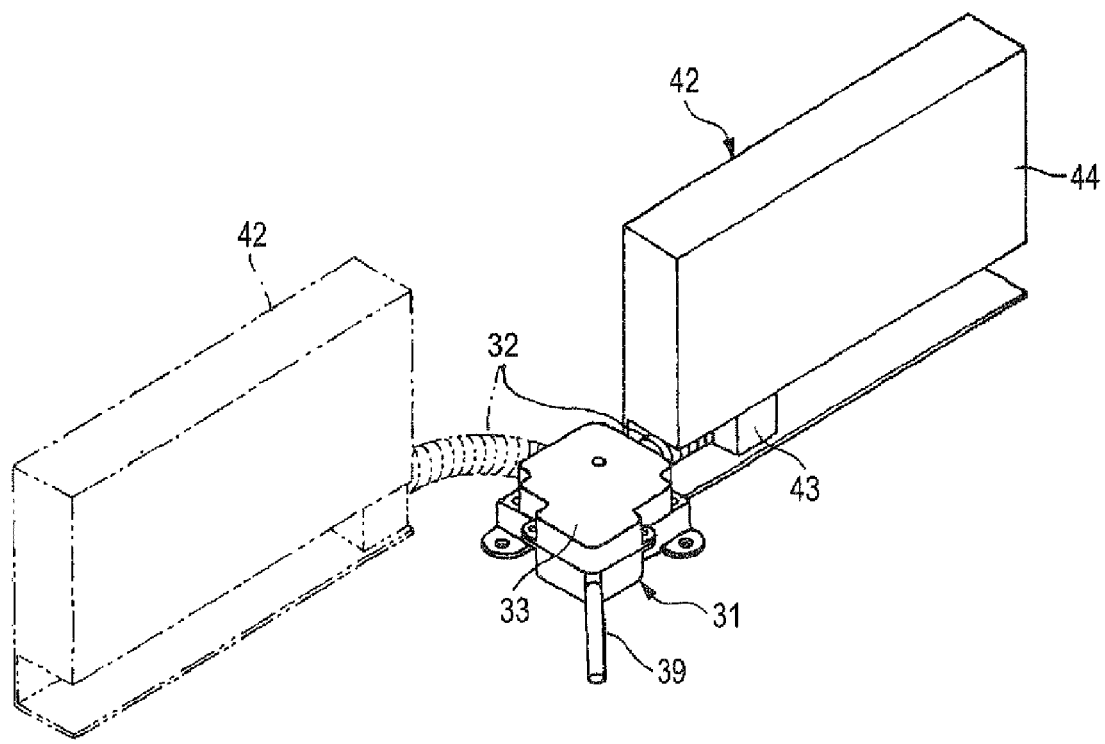
FIG. 9 is a perspective view of an example of a harness wiring structure for a swing part in the related art.
Figure 10:
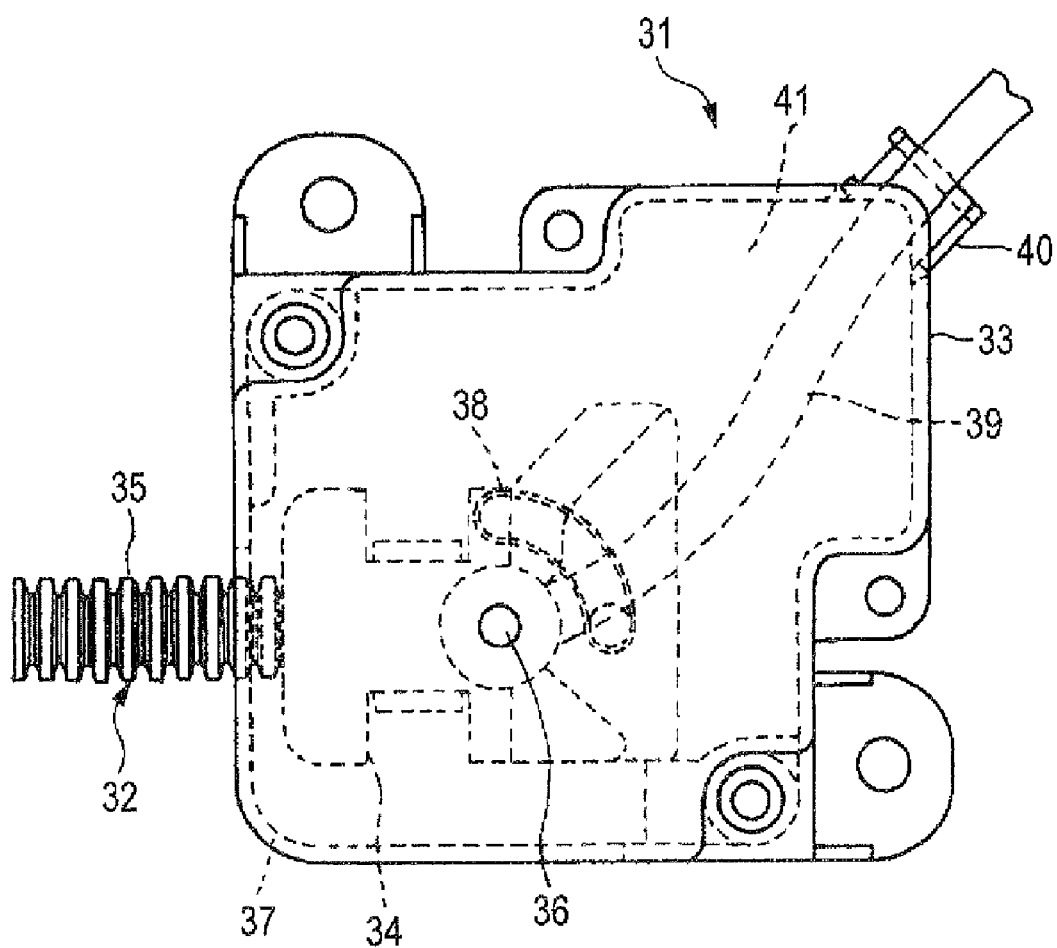
FIG. 10 is a plan view of main parts of the harness wiring structure for a swing part in the related art.
Figure 11:
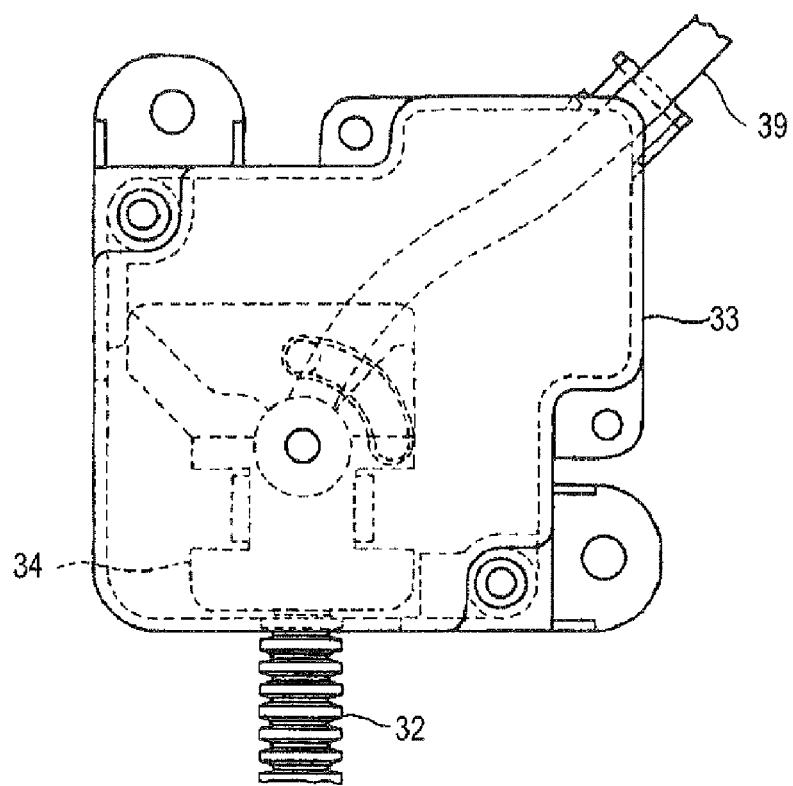
FIG. 11 is a plan view showing that the wire harness swings.

According to an example of the related art shown in, for example, FIGS. 9 to 11, the harness wiring structure according to each embodiment may be applied to a power feeding system 31 of a body of a vehicle. In this case, after a case 33 in the related art is removed, the supporting link 3 is directly fixed to the body of the vehicle by using screws. Further, as a sliding door is opened or closed, the link 1 can swing about the shaft portion 4 of the supporting link 3.

Figure 12:
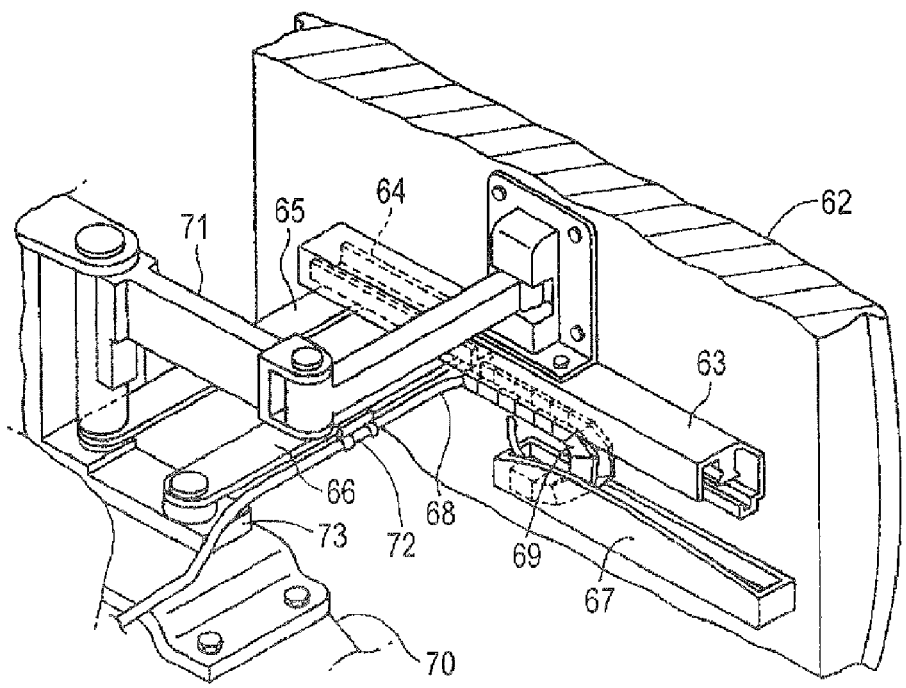
FIG. 12 is a perspective view of another harness wiring structure for a swing part in the related art.

Meanwhile, according to another application, for example, in an example of the related art shown in FIG. 12 or an example similar thereto, a door is slidably connected to a body of a vehicle through a link 1, a supporting link 3 is disposed in the body of a vehicle and/or the door, and a wire harness 5 for always feeding power is wired from the body of the vehicle to the door along a supporting link 3 and the link 1. Further, as the door is opened or closed, the wire harness 5 can be bent on the shaft portion 4 provided at one end 2 or both ends of the link 1.

Further, according to another application, a plurality of links 1 is connected to each other in series between a sliding door of a vehicle and a body of a vehicle. Furthermore, as the door is opened or closed, each of the links 1 swings in an opposite direction. In this case, the wire harness 5 can be wired on the shaft portion 4 provided in each link 1. Since an end link 1 can be substituted for a supporting link 3, the supporting link 3 can be used instead of the end link 1.

In addition, according to another application, for example, a rotary structure, such as a backdoor, a trunk lid, or a hood of a vehicle, is connected to a body of a vehicle through a link 1 and a supporting link 3 (a width direction of the link 1 corresponds to a vertical direction, and a thickness direction thereof corresponds to a horizontal direction). Further, the wire harness 5 can be wired along the link 1 and the supporting link 3 so as to pass above a shaft (on an extension line of the shaft portion 4).

Meanwhile, although a plate-shaped link has been used as each of the links 1 and 1' in the above-mentioned embodiment, a rectangular tube-shaped link (not shown) other than the plate-shaped link may be used as the link. In particular, when a swing type door of a vehicle is supported only by a link 1, it is preferable that the link have a rectangular tube shape to increase the rigidity of the link 1.

Further, the link 1 has been used as a movable member and the supporting link 3 has been used as a stationary member in the above-mentioned embodiment. However, both links, that is, one link 1 and the supporting link 3 serving as the other link may also be used as movable members. Even when the supporting link 3 is used as a stationary member, the link 1 swings with respect to the supporting link 3.

In addition, the wire harness 5 has been wired to pass above the middle of the link 1 and the supporting link 3 in the width direction of the links and the shaft portion 4 in each of the embodiments shown in FIGS. 1A, 1B and 7. However, for example, when each shaft portion 4 is disposed at both ends of the link 1 so as to deviate from the centerline of the link in the width direction of the link, the wire harness 5 is wired not in the middle of the link 1 and the supporting link 3 in the width direction but at a position corresponding to the shaft portion 4 that deviates from the centerline. FIG. 8 shows an example similar to this example.

Further, the wire harness 5 has been fixed to the link 1 and the supporting link 3 by using the fasteners 10 in each of the above-mentioned embodiments. However, for example, tape rollers, clamps, or clips (not shown) may be used as fixing members instead of the fasteners in order to fix the wire harness 5 to the link 1 and the supporting link 3.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2006-140256 filed on May 19, 2006, the contents of which are incorporated herein for reference.

What is claimed is:

1. A harness wiring structure, comprising:
   a first link that has a first fixing member;
   a second link that has a second fixing member; and
   a shaft portion that swingably connects the first link to the second link,
   wherein a wire harness is fixed by the first and second fixing member so as to extend adjacent a distal end face of the shaft portion, said wire harness extending substantially in a straight line when the first link and the second link extend along a straight line;
   wherein the first and second fixing member are disposed along a same longitudinal axis when the first link and second link extend along a straight line; and
   wherein the wire harness is wired on an imaginary line deviating from a centerline of at least one of the first link and the second link.

2. The harness wiring structure according to claim 1, wherein the wire harness is wired on a centerline of at least one of the first link and the second link.

3. The harness wiring structure according to claim 1, wherein the first fixing member is provided on a centerline of the first link or on an imaginary line deviating from the centerline of the first link.

4. The harness wiring structure according to claim 1, wherein the second fixing member is provided on a centerline of the second link or on an imaginary line deviating from the centerline of the second link.

5. The harness wiring structure according to claim 1, wherein a first distance is set so as to be equal to a second distance;
   wherein the first distance is defined as a distance between the shaft portion and the first fixing member; and
   wherein the second distance is defined as a distance between the shaft portion and the second fixing member.

6. The harness wiring structure according to claim 1, wherein a stepped portion for receiving a bent portion of the wire harness is provided on at least one of the first link and the second link at a shaft portion side thereof.

7. The harness wiring structure according to claim 1, wherein the shaft portion is extended in a first direction perpendicular to a wiring of face of the first link on which the wire harness is wired;
   wherein the second link is rotated around a shaft center of the shaft portion, the shaft center extending in the first direction; and
   wherein the distal end face is located at one end of the shaft portion in the first direction.

\* \* \* \* \*